Figures 1, 2, 3, 4, 5:
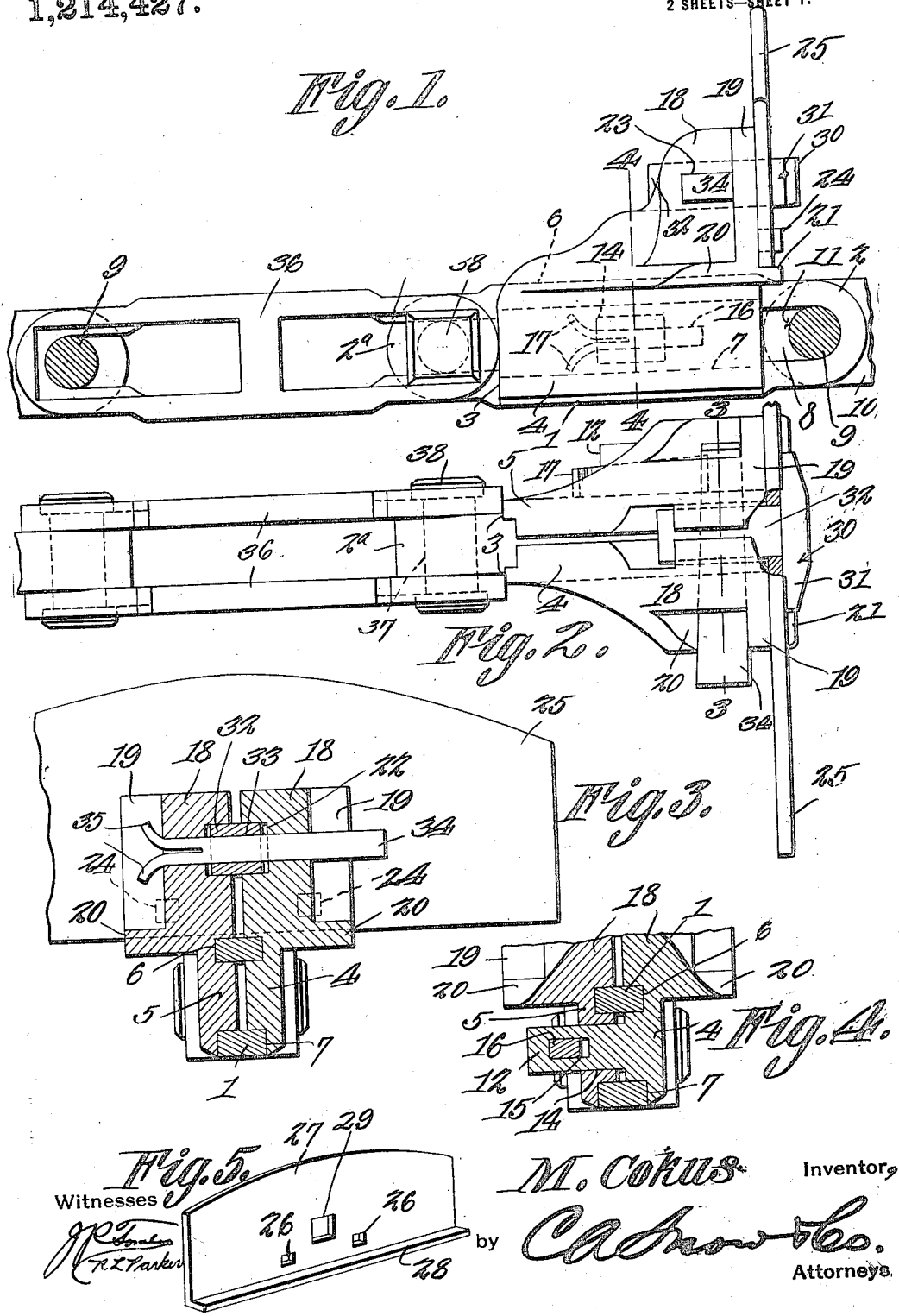

M. COKUS.
CHAIN.
APPLICATION FILED AUG. 8, 1916.

1,214,427.

Patented Jan. 30, 1917.
2 SHEETS—SHEET 1.

Witnesses

M. Cokus, Inventor
by Cashow & Co.
Attorneys

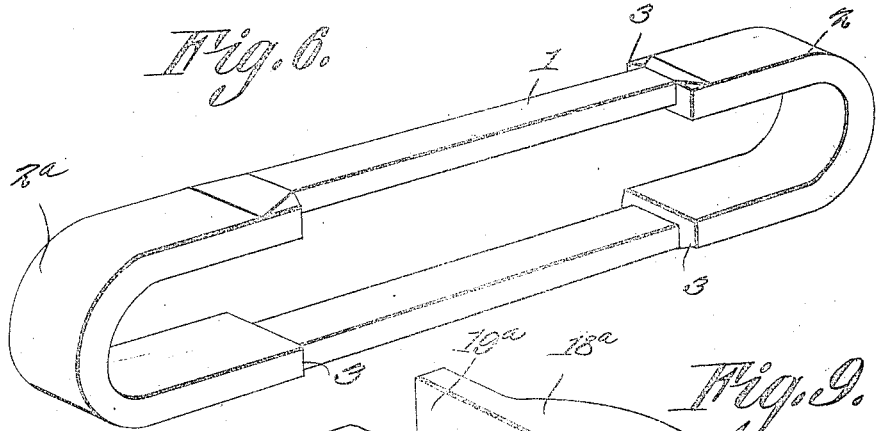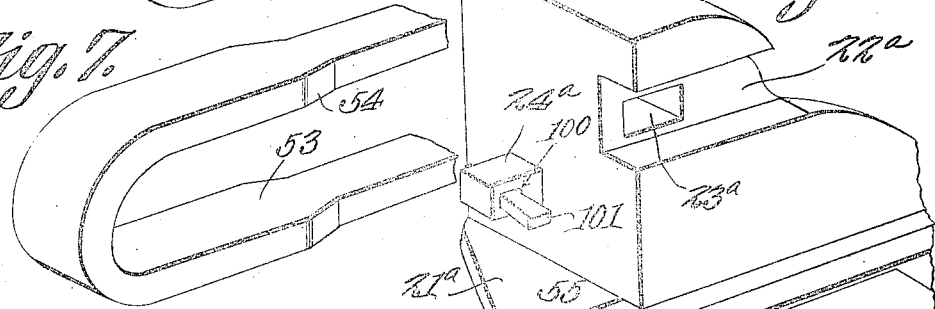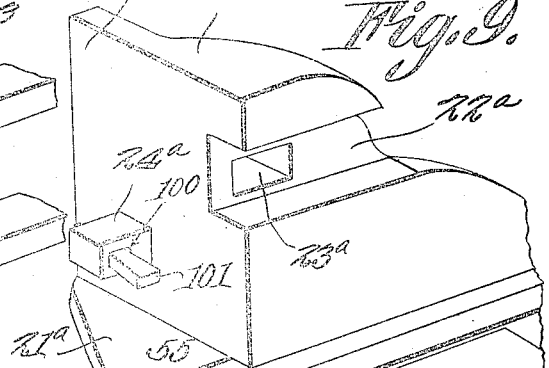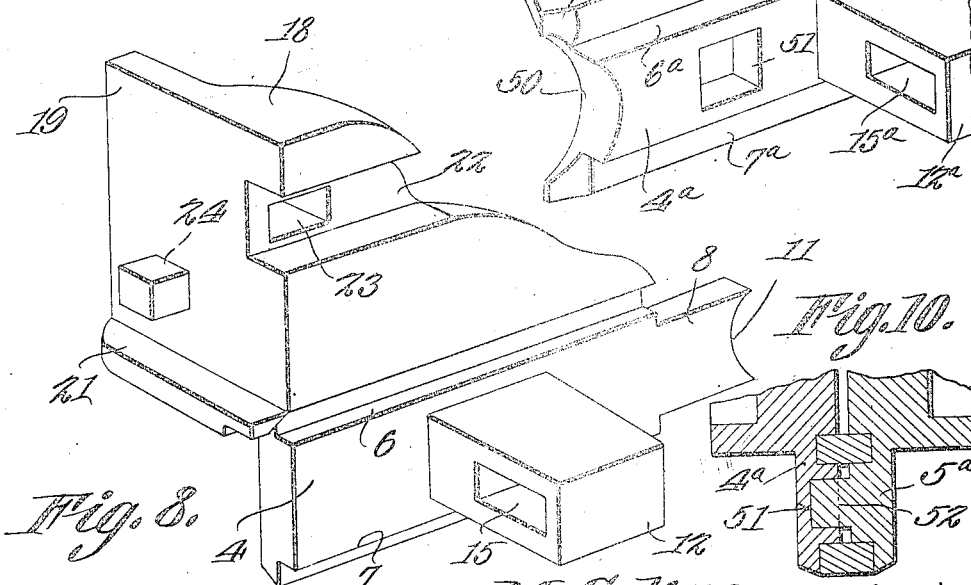

UNITED STATES PATENT OFFICE.

MICHAEL COKUS, OF FRACKVILLE, PENNSYLVANIA.

CHAIN.

1,214,427.  Specification of Letters Patent.  Patented Jan. 30, 1917.

Application filed August 8, 1916. Serial No. 113,801.

*To all whom it may concern:*

Be it known that I, MICHAEL COKUS, a citizen of the United States, residing at Frackville, in the county of Schuylkill and State of Pennsylvania, have invented a new and useful Chain, of which the following is a specification.

The device forming the subject matter of this application is a link adapted to carry a scraper of the sort which commonly constitutes part of a conveyer chain, the device being adapted peculiarly for use in and about coal mines.

One object of the invention is to provide novel means whereby a pair of opposed side members may be assembled with a link, the side members being adapted to carry a scraper.

Another object of the invention is to provide novel means whereby the scraper may be assembled with the side members.

A further object of the invention is to provide novel means whereby wear may be taken up, and whereby defective parts may be renewed and replaced with a minimum expenditure of effort.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings;—Figure 1 shows in side elevation, a portion of a conveyer chain constructed in accordance with the present invention; Fig. 2 is a top plan of the device, sundry parts being sectioned; Fig. 3 is a cross section approximately on the line 3—3 of Fig. 2; Fig. 4 is a cross section taken approximately on the line 4—4 of Fig. 1; and Fig. 5 is a fragmental perspective showing a slight modification in the scraper; Fig. 6 is a perspective showing the main link of the chain; Fig. 7 is a fragmental perspective showing a slightly modified form of link; Fig. 8 is a perspective showing one of the side plates and attendant parts; Fig. 9 is a perspective showing a slight modification in the side plate for use with the link shown in Fig. 7; Fig. 10 is a fragmental cross section showing the side plate of Fig. 9 coöperating with a corresponding plate.

The chain forming the subject matter of this application preferably is made of metal throughout and includes a main link 1, the ends of which are denoted by the reference characters 2 and 2ª. The ends 2 and 2ª of the main link 1 are broadened to form vertical shoulders 3 adjacent the ends of the link. To the opposite vertical faces of the link 1 side plates 4 and 5 are applied. The ends of the side plates 4 and 5 abut against the shoulders 3, and consequently, the side plates cannot move endwise, independently of the link 1. The side plates 4 and 5 are provided with upper grooves 6 coöperating to receive the upper bar of the main link 1, and are provided with lower grooves 7 coöperating to receive the lower bar of the main link 1. At one end, the side plates 4 and 5 are provided with extensions 8 lying within the contour of the main link 1. The ends of the extensions 8 are concaved as shown at 11 to coöperate with the end 2 of the main link 1 in receiving a rivet 9 engaging the ends of a pair of auxiliary links 10 located on opposite sides of the main link 1 at one end thereof. An arm 12 projects laterally from the side plate 4 and extends through an opening 14 in the side plate 5. In the arm 12 there is fashioned a transverse opening 15. A tapered key 16 is thrust through the opening 15 in the arm 14 and bears against the side plate 5. Owing to the construction above described, the side plates 4 and 5 are held securely on the main link 1. The smaller extremity of the tapered key 16 is split to define ends 17 which are bent vertically as indicated in Figs. 1 and 2. The ends 17 of the key 16 coöperate with the arm 12 to prevent the key 16 from being drawn from the arm. The side plates 4 and 5 are provided with upstanding bodies 18. The forward ends of the bodies 18 are provided with upright abutment plates 19. At their sides and at their lower ends, the body portions 18 of the side plates are equipped with laterally projecting platforms 20. The platforms 20 extend in front of the abutment plates 19, as indicated at 21. In the inner faces of the body portions 18 of the side plates, grooves 22 are fashioned. The body portions 18 of the side plates are equipped with alined openings 23 disposed in the same plane with the longitudinal opening defined by the grooves 22. Studs 24 project forwardly from the abutment plates 19, and are located above the extended portions 21 of the platforms 20.

A scraper 25 rests on the extended portions 21 of the platforms 20 and abuts against the plates 19. The scraper 25 is provided with openings 26 receiving the studs 24 on the abutment plates 19. The scraper may be provided at its bottom with a forwardly presented flange 28, this detail being a modification illustrated in Fig. 5, in which figure, the scraper is denoted by the numeral 27, because of the modification, but, otherwise, the scraper 27 is constructed like the scraper 25 shown in Fig. 1. The scraper 25 or 27 is equipped with an opening 29 located between the openings 26 and alined with the longitudinal opening defined by the grooves 22. The invention includes a T-shaped securing device 30 including a head 31 and a shank 32. The head 31 of the securing device 30 bears against the forward face of the scraper 25, and the shank 32 of the securing device passes rearwardly through the opening 29 and the opening defined by the grooves 22. The shank 32 of the securing device 30 is provided with a transverse opening 33 alined with openings 23 in the body portions 18 of the side plates 4 and 5. Through the openings 23 and through the opening 33 in the shank 32 of the securing device 30 is placed a tapered key 34. The smaller end of the key 34 is split to define bendable fingers 35 which as shown in Fig. 3 coöperate with the body portion of one side plate, to prevent the key from being withdrawn. The T-shaped securing device 30, combined with the key 34, the studs 24 and the openings 26, constitute a means whereby the scraper 25 is securely held in place, the shank 32 of the securing device 30 passing through the opening 29 in the scraper.

The numeral 36 indicates a pair of auxiliary links which lie on opposite sides of the end 2ᵃ of the main link 1. The links 36 are connected with the end 2ᵃ of the main link 1 by a rivet 37 having squared heads 38, the links 36 being grooved in their sides as indicated at 39, to receive the squared heads 38 of the rivets.

The general construction of the device is such that it can be taken down and set up readily, when repairs are required. Because such elements as the tapered split key 16, the key 34 and the like are used, wear can be taken up readily, and no bolts are called for.

In Fig. 7 of the drawings there is shown a slightly modified form of link now on the market and known to the trade as the "Wilmot" link. The shoulders 54 of this link denoted by the numeral 53, are inclined, whereas the shoulders 3 of the link 1 shown in Fig. 6 are disposed substantially at right angles to the length of the link, or nearly so.

In Fig. 9 of the drawings, there is shown a slightly modified form of side plate adapted to be used with the link 53 shown in Fig. 7. In Fig. 9, parts previously described have been designated by numerals hereinbefore used, with the suffix "a." In the modification disclosed in Fig. 9, the side plate 4ᵃ may be rounded on one end, as shown at 50, for the purpose hereinbefore described. In the side plate 4ᵃ there is fashioned an opening 51. The side plate is shaped or beveled as shown at 55, to coöperate with the shoulder 54. The complemental side plate 5ᵃ is provided with a lug 52 adapted to be received in the opening or recess 51 of the plate 4ᵃ.

It is to be understood that the elements 24 or 24ᵃ may be located as found expedient or necessary.

The studs 24ᵃ may be provided with openings 100, adapted to receive split keys 101. These keys 101 may be used to hold the scraper 25 in place. When the keys 101 are employed, the T-shaped securing device 30 which is received in the grooves 22ᵃ may be dispensed with.

Having thus described the invention, what is claimed is:—

1. In a device of the class described, a link; side members applied to opposite faces of the link, the side members having transverse openings, and being provided in their inner faces with coöperating grooves defining a longitudinal opening, one side member being provided with an aperture, and the other side member being equipped with an arm extended through the aperture; a tapered, split key extended through the arm and coacting with the side member which is provided with the aperture; a scraper disposed transversely of the side members; a fastening device including a head engaging the scraper, and a shank passing through the scraper and entering the longitudinal opening; and a tapered split key mounted in the transverse openings and engaging the shank of the fastening device.

2. In a device of the class described, a link; side members applied to opposed faces of the link, the side members having transverse openings, and being provided in their inner faces with coöperating grooves defining a longitudinal opening, one side member being provided with an aperture, and the other side member being equipped with an arm extended through the aperture; a clamping means on the arm and coacting with that side member which is provided with the aperture; a scraper disposed transversely of the side members; a fastening device including a head engaging the scraper, and a shank passing through the scraper and entering the longitudinal openings; and a securing element mounted in the transverse openings and engaging the shank of the fastening device.

3. In a device of the class described, a link; side members applied to opposite faces of the link, the side members including abutments and platforms outstanding from the abutments, the abutments having studs, and being provided with transverse openings, one side member having an aperture, and the other side member being equipped with an arm extended through the aperture; a scraper supported on the platforms and engaging the abutments, the scraper having openings receiving the studs; means coöperating with the studs and the abutments in retaining the scraper; a key inserted through the arm and engaging the side member which is provided with the aperture; and a key inserted through the transverse openings in the abutments.

In testimony that I claim the foregoing as my own, I have hereto affixed my signature in the presence of two witnesses.

MICHAEL COKUS.

Witnesses:
 GEORGE M. HEIM,
 S. T. PURNELL.